United States Patent [19]

Williams et al.

[11] Patent Number: 4,538,790
[45] Date of Patent: Sep. 3, 1985

[54] VALVE STEM PACKING ASSEMBLY

[75] Inventors: Peter C. Williams, Cleveland Heights; Ulrich H. Koch, Bainbridge Township, Cuyahoga County; Edward M. Yusko, Jr., Cleveland; Thomas M. Mannion, University Heights, all of Ohio

[73] Assignee: Whitey Co., Highland Heights, Ohio

[21] Appl. No.: 478,270

[22] Filed: Mar. 24, 1983

[51] Int. Cl.³ .............................................. F21K 3/44
[52] U.S. Cl. .................................. 251/214; 251/312; 277/124; 277/106; 277/215; 267/158; 411/544
[58] Field of Search ................. 251/214, 312, 309; 277/106, 111, 124, 215; 267/158, 159, 160; 411/544, 533

[56] References Cited

U.S. PATENT DOCUMENTS

| | | |
|---|---|---|
| 1,795,570 | 3/1931 | Nilson . |
| 2,110,098 | 3/1938 | Strecker ........................... 251/103 |
| 2,194,265 | 3/1940 | Abercrombie ...................... 166/14 |
| 2,713,482 | 7/1955 | Stapleton ......................... 411/544 |
| 2,912,266 | 10/1959 | Nordell ........................... 286/31 |
| 3,039,780 | 6/1962 | Nordell ........................... 277/125 |
| 3,108,018 | 10/1963 | Lewis ............................. 117/161 |
| 3,164,362 | 1/1965 | Lavigueur ......................... 251/174 |
| 3,168,279 | 2/1965 | Anderson et al. ................... 251/181 |
| 3,214,182 | 10/1965 | Herbruggeh ........................ 277/215 |
| 3,239,191 | 3/1966 | Widera ............................ 251/214 |
| 3,387,815 | 6/1968 | Richards .......................... 251/174 |
| 3,567,178 | 3/1971 | Nelson ............................ 251/214 |
| 3,586,289 | 6/1971 | Priese ............................ 251/214 |
| 3,717,323 | 2/1973 | Geipel ............................ 251/315 |
| 3,883,112 | 5/1975 | Milleville et al. ................. 251/174 |
| 4,006,881 | 2/1977 | Gaillard .......................... 251/214 |
| 4,364,542 | 12/1982 | Meyer ............................. 251/214 |
| 4,379,557 | 4/1983 | Saka .............................. 251/214 |

Primary Examiner—Carroll B. Dority, Jr.
Attorney, Agent, or Firm—Fay, Sharpe, Fagan, Minnich & McKee

[57] ABSTRACT

A valve body has a stem passage rotatably receiving a valve stem. A packing surrounds the stem in the passage and a packing nut threaded on the stem applies axial force to radially expand the packing into sealing engagement with the stem and passage wall. Controlled slippage components interposed between the packing and packing nut allow rotation of the stem and packing nut without any rotational sliding movement against an end face of the packing. A packing support ring engages the end face of the packing adjacent the packing nut and includes a chevron surface for radially expanding the packing. A gland engages the support ring and a pair of reversely positioned spring washers are interposed between the gland and packing nut. During rotation of the stem, packing nut and spring washers, the gland rotates against the packing support ring. The chevron surface of the support ring includes notches for gripping the packing to prevent relative sliding movement therebetween. A handle is attached to the stem by a handle nut, and a spring washer interposed between the handle and handle nut prevents loosening of the handle nut.

28 Claims, 5 Drawing Figures

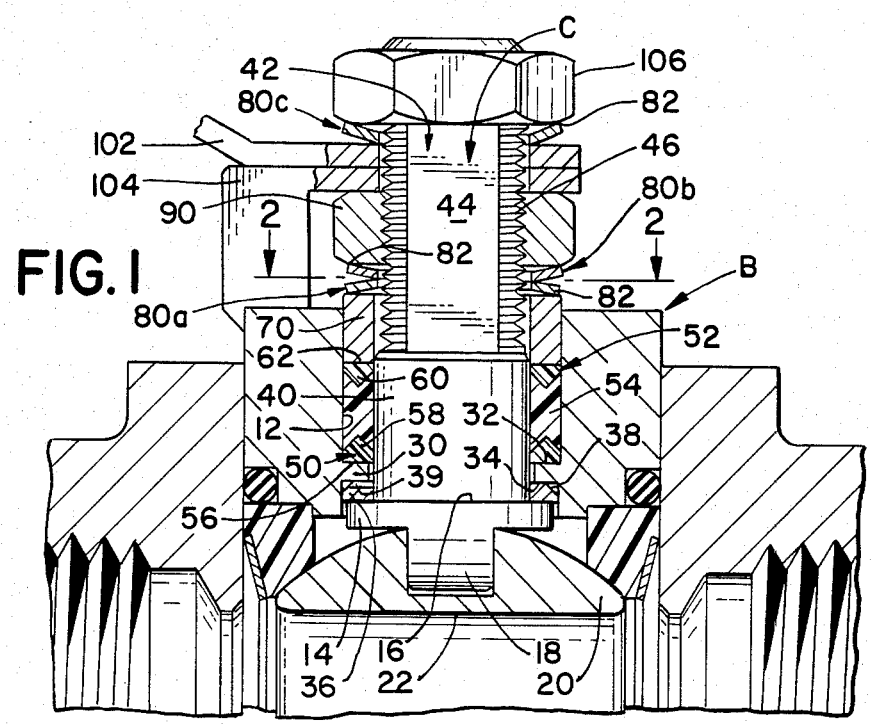
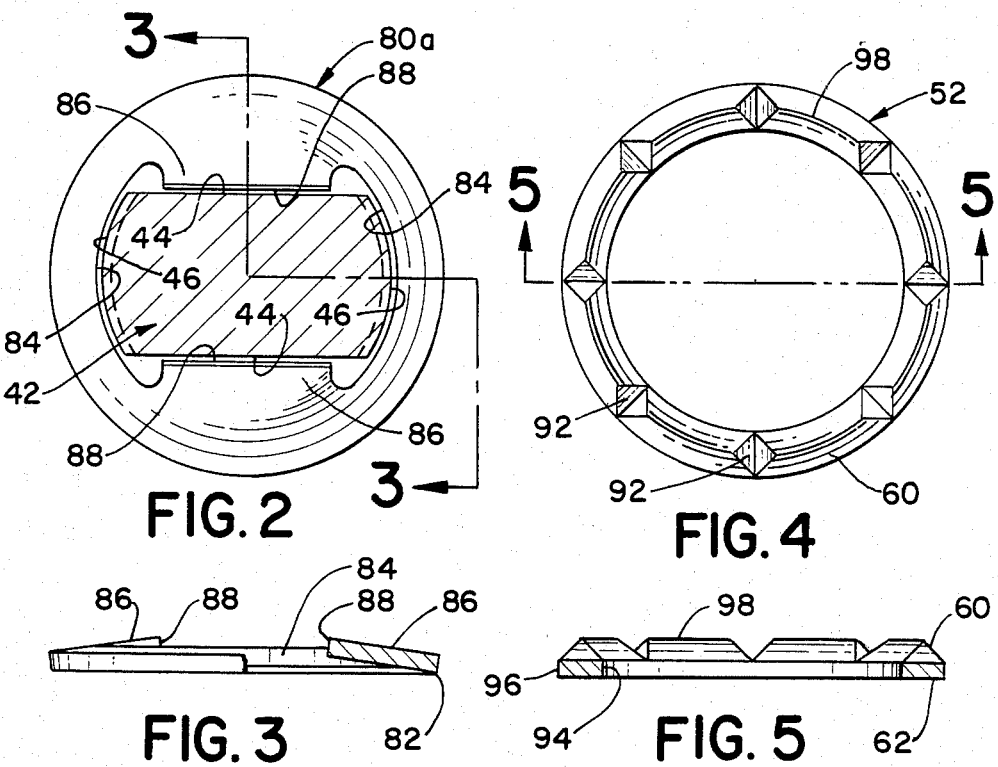

VALVE STEM PACKING ASSEMBLY

BACKGROUND OF THE INVENTION

This application relates to the art of valves and, more particularly, to valve stem packing assemblies for quarter turn valves such as ball, plug or butterfly valves.

The two purposes of stem packing assemblies for quarter turn, half turn and similar valves are to seal the passage through which the rotatable stem penetrates the valve body and to provide a bearing for carrying the internal pressure load acting on the stem. These two purposes apply to stem packing assemblies for all kinds of quarter turn, half turn and similar valves, including ball, plug or butterfly. The requirements differ from other valves in that the motion is pure rotation for only a partial turn and there is no axial motion.

The most basic stem packing approach comprises an O-ring seal. Such a seal is simple to produce, small, compact, inexpensive, and effective in many non-demanding applications.

A more sophisticated approach uses a bushing of Teflon (a trademark of E. I. duPont de Nemours and Company for polytetrafluorethylene materials). This is probably the most common type of construction, and means is typically provided for compressing the bushing. This approach is a little larger, more expensive and more complex as compared to an O-ring. However, the Teflon bushing arrangement can be used with a wider variety of chemicals and usually over a much wider temperature range as compared to O-rings.

A third approach uses a high temperature material other than Teflon, such as asbestos or Grafoil (a trademark of Union Carbide Corporation for an expanded flexible carbonaceous material having no resin or organic binders). These arrangements are generally too expensive and not sufficiently reliable for general use, and are usually reserved for high temperature applications.

All of the above seal arrangements have certain limitations and undesirable characteristics depending upon the application. With O-rings, pressures and temperatures are restricted to moderate levels and useful ranges, and suitable materials for O-rings are incompatible with many chemicals and solvents.

Although Teflon is compatible with most chemicals, it is temperature limited. Asbestos or Grafoil can withstand high temperatures but are not as leaktight and reliable under normal conditions. Teflon, asbestos, and Grafoil wear out with cycling of the valve so the packing becomes loose and leaks, thus requiring frequent adjustment. Thermal cycling also causes the packings to become loose because the packing materials expand at different rates then metals.

Teflon is particularly troublesome because it expands approximately ten times as fast as metal.

All of the above limitations exist with normal packing systems in normal service. When fire safety requirements are added, the limitations are much more serious because the packing must seal during and after a fire, and the valve must be operable, at least once or a few times, without leaking. The usual materials used for O-rings, Teflon and other nonmetallics, are destroyed during a fire, and are either completely gone or leave only a charred residue. Even fire resistant materials can fail if the heat causes a small amount of shrinkage which, in turn, causes the packing to become loose.

Supporting the thrust load on the stem is done internally or externally, with internal perhaps being the most common. In internal thrust loading, the stem includes a head having a shoulder for supporting a bearing. The stem is inserted from the inside of the body, and a bearing material is located between the stem shoulder and a flange on the body. This bearing carries the thrust load and allows the stem to rotate freely. The bearing arrangement is small, compact, inexpensive and the stem head makes the stem inherently blowout proof. The stem cannot blowout of the valve body under pressure even if all the external packing components are removed. However, internal bearings are subject to damage by processing fluids.

A less common construction is an external thrust bearing, usually combined in some way with the stem packing. This requires some kind of external yoke construction which is larger, more expensive and, if it is removed or damaged in service, the stem can blowout under pressure. The main advantage is that it places the bearing outside, away from the system fluid, where it can be lubricated and constructed for maximum wear life. However, external bearings are exposed to contamination, dirt and corrosive atmospheres. In most quarter turn valves, the wear on the thrust bearing is rarely the factor which limits valve performance.

Bearing loads are also affected by packing adjustment. The packing load is usually applied by clamping against the bearing, and avoiding such clamping requires additional complex yoke devices on both internal and external bearing systems. Overtightening the packing, either by excessive manual adjustment or by thermal expansion, can overload the bearing. This situation causes even faster packing and bearing wear, shorter life, and further loosening.

It has been considered desirable to eliminate or minimize the foregoing limitations and undesirable characteristics in a simple, reliable, and inexpensive manner. The subject invention is considered to meet these needs and others by providing a new and improved valve stem packing assembly.

SUMMARY OF THE INVENTION

A valve body has a stem passage rotatably receiving a valve stem having an enlarged head on its inner end. The stem is inserted into the stem passage from inside the body and the peripheral back face of the head defines a shoulder or thrust bearing surface which cooperates with an inwardly extending flange adjacent the bottom of the stem passage.

A thrust washer interposed between the stem shoulder and the stem passage flange is comprised of metal to provide rigidity and because it will survive a fire. The thrust washer is coated with Teflon on both faces to provide lubricity during normal service. The coating will be burned away during a fire, but it is so thin (0.001–0.002) that the loss of axial dimension will not loosen the packing. While a coating is preferred, a very thin film could also be used. The thrust washer is of Nitronic 60 (a trademark of Armco, Inc. for stainless steel). This type of stainless steel does not gall when it slides against the metal body after a fire, or if the coating wears out in normal service.

The packing itself is comprised of Grafoil having a wire reinforcement, such as knitted wire of the type manufactured by Metex Corporation of Edison, N.J. The Grafoil seals well at normal operating temperature and also in a fire. It does not undergo any gross size changes, such as severe shrinkage because of a fire. Its coefficient of thermal expansion is fairly close to those of metals, much closer than any plastics, so size changes during normal temperature changes and during a fire are manageable.

Wire reinforcement of the Grafoil provides it with strength, cohesiveness for wear resistance, and, most importantly, resiliance for thermal cycling. The wear life of Grafoil can be good under the proper conditions, but it is easily damaged. Ideally, the rubbing part should be very smooth as a rough surface will tear Grafoil and destroy it. The compressive load should be just high enough to seal, but no more. Excess load causes the Grafoil to adhere to the stem, tear off flakes, and wear out rapidly. Close clearances at each end are required to prevent extrusion of the Grafoil under pressure.

Upper and lower packing support rings are essential to make the Grafoil work. Chevron shaped packing support rings wedge the Grafoil radially against the stem and body to apply a sealing force in the desired direction. Grafoil does not flow easily, so flat faced support rings would apply a very high end load in order to reach the same radial load. Such loading would crush the Grafoil and shorten its life.

The packing support rings are constructed of a polyimide plastic material, such as Vespel (a trademark of E. I. duPont de Nemours and Company for specialty polyimide plastics having high temperature resistance). Making the support rings of Vespel instead of metal allows them to be constructed with an extra close fit to the stem. If the Vespel rubs on the stem, it wears slightly and does no harm. Metal support rings would score the stem, damage the surface, and, in turn, damage the Grafoil wear surface. Hence, metal rings would require larger clearances and this is not desirable because close clearances are essential to prevent packing extrusion for maximum life.

Vespel also survives a fire. Even though Vespel is a synthetic and is carbonized by the heat, there is no size loss. Vespel also retains enough compressive strength to function during and after a fire. There are also other new polymers which do not melt, burn, or vaporize, and these may be used instead of Vespel.

A very important second function of the upper support ring is to form the interface between the rotatably sliding parts. The handle or other actuator, nuts and other upper components must rotate with the stem while the packing remains stationary with the body. At some point, there must be an interface where rotational sliding motion occurs. Controlling the location of that interface is critical.

Sliding rotation of any part directly against the end face of the Grafoil is unacceptable because it causes very rapid wear of the Grafoil. Despite the wedging action of the chevron shaped support rings, the axial stress on the Grafoil is higher than the radial stress forming the seal along the stem, so rotation of the stem relative to the Grafoil is acceptable at the radial interface. To prevent any sliding against the end face of the Grafoil, the upper support ring includes radial notches which lock into the Grafoil as it is compressed to prevent any sliding at that junction.

A metal ring gland bears against the upper support ring, and turns with the stem and slides on the ring. Vespel has good wear resistance and low friction, so its flat upper face makes a good bearing for the gland. Using a metal ring would preclude this solution for a rotational interface and would require some other controlled bearing area. The gland also provides a rigid backing for the Vespel support ring. The clearances for the gland are slightly larger to preclude metal rubbing, but still close enough to support the Vespel and prevent it from cracking at an unsupported edge.

At least one frusto-conical spring washer interposed between the lower packing nut and the gland provides the entire packing assembly with elasticity. The lower packing nut is adjusted to compress the spring until it applies a controlled clamping force on the packing. Flexibility of the spring washer allows the system to absorb small dimensional changes from thermal expansion or wear without loosening or overtightening the packing. Preferably, a pair of reversely positioned spring washers in series is employed.

The unique shape of the spring washers lock them to the flats of the valve stem, assuring that the spring washers always turn with the stem and prohibit sliding motion between the springs and handle. The outer edge of the lower spring bears on the gland. Since there is almost a line contact, the unit stress is very high as is the friction, effectively locking the spring and gland together. Thus, the gland turns with the spring washers and stem, and, in turn, must slide on the Vespel support ring. The packing nut bears on the outer edge of the upper spring washer to create a strong locking action and prevent the nut from loosening during cycling.

A handle and a stop plate are received on the stem and rest on the lower packing nut. Openings in the handle and stop plate are cooperatively shaped with the stem to preclude relative rotation of these two components with respect to the stem. The handle is secured to the stem by an upper handle nut. A third spring washer, identical to the two previously mentioned, is interposed between the handle and handle nut to lock the handle nut against rotation.

Cycling the valve with the handle will inevitably develop some looseness between the handle and stem flats due to clearances, tolerances, and some distortion from use. This will allow some small relative motion between the handle, stem and handle nut which would eventually unscrew the nut. The upper or third spring prevents such loosening.

Flats on the opening in the third spring limit its rotation but, just like the handle, cannot prevent it entirely. The spring is purposely positioned with the inner edge disposed against the handle and the outer edge in engagement with the handle nut. The axial forces of the spring washer are equal and opposite at these two edges, as are the friction forces. The torque, however, is always greater at the outer edge because of the longer radius. Therefore, any relative motion will cause sliding at the inner radius, i.e., between the spring and handle first, before sliding at the nut. This effectively prevents the small motions of the handle from being transmitted to the handle nut and gradually loosening it.

All of the foregoing discussion is based on the primary application of the new packing assembly in a firesafe valve, but applies equally well to a valve intended for normal service at elevated temperatures. This would be above the range for a Teflon packing but within the capability of Vespel and numerous other high performance polymers. In that case it may be desirable to replace the support rings and the metal thrust bearing with a suitable plastic. The principles and component functions would not be altered.

Finally, the same basic construction can be used to advantage in the normal valve with Teflon packing, but not firesafe. In that case, the packing support rings need not be chevron shaped, and could be constructed from a reinforced Teflon ring instead of Vespel. The metal thrust bearing may be replaced by some rigid plastic bearing material such as Vespel or a filled, reinforced Teflon. The spring washers compensate for the very high expansion rate of Teflon and prevent overloading the less rigid bearing.

The principal advantage of the present invention is the provision of an improved valve stem packing assembly which is small, compact, simple and economical to manufacture.

Another advantage of the invention is the provision of such an assembly with a blowout proof stem construction.

Another advantage of the invention is the provision of such an assembly which will work effectively with ordinary Teflon packing for normal use.

Still another advantage of the invention is the provision of such an assembly which works equally well with high temperature materials for routine service at elevated temperatures.

Yet another advantage of the invention is the provision of such an assembly which meets the fire safety requirements during and after a fire and provides reliable service during normal operation.

An additional advantage of the invention resides in a stem packing assembly which compensates for wear to extend the life of the packing between adjustments.

Still other objects and benefits of the subject invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is a cross-sectional elevational view of a valve stem and packing assembly constructed in accordance with the present application;

FIG. 2 is a partial cross-sectional plan view taken generally along lines 2—2 of FIG. 1;

FIG. 3 is a cross-sectional elevational view taken generally along lines 3—3 of FIG. 2;

FIG. 4 is a plan view of a support ring; and,

FIG. 5 is a cross-sectional elevational view taken generally along lines 5—5 of FIG. 4.

DETAILED DESCRIPTION OF THE PREFERRED EMBODIMENT

Referring now to the drawings, wherein the showings are for purposes of illustrating the preferred embodiment of the invention only and not for purposes of limiting the same, FIG. 1 shows a valve body B having a cylindrical stem receiving passage 12 therein for rotatably receiving a valve stem C. Valve stem C includes an inner enlarged head 14 thereon providing a circumferential flat shoulder 16 on the rear surface thereof. Enlarged head 14 includes a transverse projection 18 received in a suitable groove in a valve member 20 having a valve passage 22 therethrough.

An inwardly extending circumferential flange 30 is provided in stem passage 12 adjacent the inner end thereof. Upper and lower flat flange surfaces 32,34 cooperate with various parts of the stem and packing assembly. A thrust washer or bearing washer 36 is interposed between stem shoulder 16 and flange surface 34. A chamfer 38 extends around thrust washer 36 between the outer periphery and the flat surface thereof engaging flange surface 34. Chamfer 38 extends over substantially less than one-half the radial thickness between its inner and outer peripheries. In a preferred form, thrust washer 36 is of Nitronic 60 stainless steel and is provided with a very thin coating or film between 0.001 and 0.002 inch thick of Teflon on its opposite flat end faces. It will be recognized that other materials could also be used depending upon the application for the valve. Also, one or both faces of the thrust washer advantageously may include V-shaped notches or the like for housing a supply of lubricant or lubricating material. One such notch is designated by numeral 39 in the upper face of washer 36 as shown in FIG. 1.

Valve stem C has a smooth cylindrical lower stem portion 40 and an elongated smaller threaded stem portion 42. The stem also includes opposite flat stem surfaces 44, and opposite stem threaded surfaces 46 which are curved to lie on the periphery of a circle.

Inner and outer packing support rings 50,52 are positioned at opposite ends of cylindrical packing 54. Support rings 50,52 and packing 54 surround stem portion 40 within stem passage 12, with flat end surface 56 on inner support ring 50 engaging flange surface 32. Support rings 50,52 have chevron portions or surfaces 58,60 facing toward each other, i.e., toward packing 54. Chevron portions or surfaces 58,60 are generally V-shaped, and act to force packing 54 to flow radially inwardly and outwardly into firm sealing engagement with stem portion 40 and the wall of stem passage 12.

Outer support ring 52 has a flat end surface 62 engaged by a cylindrical metal gland 70. A pair of reversely positioned generally frusto-conical metal spring washers 80a,80b are received on threaded stem portion 42. As best shown in FIGS. 2 and 3, spring washer 80a is dished so its upper and lower surfaces are generally parallel and lie on the surfaces of cones. The concave under face of spring washer 80a intersects the outer periphery thereof at a circular outer peripheral edge 82. A central hole or opening through spring washer 80a provides inner peripheral edge portions at the intersection of the hole surfaces with the convex surface of the spring. Opposite curved inner peripheral edge portions 84 of spring washer 80a lie on the periphery of a circle having a diameter slightly larger than the diameter of the circle on which threaded stem surfaces 46 lie. Also, the spring washer includes opposite inwardly projecting extensions 86 with opposed flat or straight edges 88. The spacing between the opposed spring washer flat or straight edges 88 is slightly greater than the spacing between stem flats 44.

With the arrangement shown and described, threaded stem portion 42 and the openings in the spring washers are cooperatively shaped for preventing relative rotation between the stem and spring washers. As clearly shown in FIG. 3, straight edges 88 are axially-spaced from outer peripheral edge 82 a distance substantially greater than the spacing between outer peripheral edge 82 and inner peripheral edge portions 84. Extensions 86 also provide a variable spring rate as they first deform axially until straight edges 88 lie in a common plane with inner peripheral edge portions 84, whereupon a new spring rate takes effect because the entire spring washer then deforms axially.

Spring washers 80a,80b are positioned with their inner peripheral edge portions engaging each other. Outer peripheral edge 82 of washer 80a engages a flat end surface on gland 70. Outer peripheral edge 82 on spring washer 80b engages a flat surface on a packing nut 90 which is threadably received on stem portion 42.

With the components assembled as shown and described, packing nut 90 is tightened to move spring washers 80a,80b toward a flattened condition and apply a controlled axial force on gland 70, packing 54, and support rings 50,52. The degree to which the spring washers are flattened will vary depending upon the specific material used for packing 54. For example, and with a Teflon packing, packing nut 90 compresses the springs until they are almost flat to apply a controlled clamping force on the packing. This is essential to prevent overloading the bearing and Teflon which would cause a breakdown of both. With a Grafoil packing, spring washers 80a,80b are compressed to beyond a flat condition. This insures that the upper support ring 52 will be firmly embedded in the packing, and will accommodate packing shrinkage in the event of exposure to elevated temperature such as those encountered in a fire.

FIGS. 4 and 5 show outer support ring 52 as having a plurality of generally V-shaped circumferentially-spaced radially extending notches 92 therein. Support ring 52 has inner and outer cylindrical surfaces 94,96 and notches 92 extend substantially through chevron portion 60 to intersect cylindrical surfaces 94,96. Chevron portion or surface 60 has opposite inclined surfaces which intersect one another at a 90° angle at a sharp edge 98 midway between inner and outer cylindrical surfaces 94,96.

Overall, inner support ring 50 of FIG. 1 is shaped in the same manner as support ring 52 of FIGS. 4 and 5. However, inner support ring 50 does not include notches 92 therein.

A two-piece handle includes a manually graspable handle 102 and a stop plate 104. It will be recognized that the positions of the handle and stop plate can be reversed or that a one-piece handle can be provided. Stop plate 104 cooperates with upwardly extending projections on valve body B to limit rotation of stem C to 90° between the open and closed positions of the valve. Handle 102 and stop plate 104 have central openings therein generally corresponding in size and shape to the cross-sectional size and shape of stem portion 42 has shown in FIG. 2. Handle 102 and stop plate 104 rest against packing nut 90. A handle nut 106 threaded on stem portion 42 secures handle 102 and stop plate 104 to valve stem C, and a spring washer 80c is interposed between handle 102 and handle nut 106. Spring washer 80c is positioned with outer peripheral edge 82 thereof engaging a flat surface on handle nut 106 while the inner peripheral edge portions thereof engage a flat surface on handle 102.

Packing nut 90 and spring washers 80a,80b provide an axial force applying means for axially compressing packing 54 and expanding same radially into sealing engagement with stem portion 40 and the wall of stem passage 12. Spring washers 80a,80b provide a controlled axial force to prevent overloading of the parts, particularly the packing, and also to accommodate thermal expansion. When packing 54 is constructed of a wire reinforced Grafoil, chevron surfaces 58,60 on packing support rings 50,52 greatly facilitate radial expansion of the packing material without axially overloading same. Notches 92 in outer packing support ring 52 define gripping means for gripping one end face of packing 54 to prevent relative rotational sliding movement between the support ring and packing.

When stem C is rotated by operation of handle 102, packing nut 90 and springs 80a,80b also rotate therewith. The firm engagement of outer peripheral edge 82 of spring 80a with gland 70 causes the gland to rotate relative to outer support ring 52. This result is due to the fact that the frictional force resisting relative rotation between ring 52 and gland 70 is substantially less than the frictional force between spring washer 80a and gland 70.

Tolerances and wear may cause some limited relative rotation between handle 102 and stem portion 42. In that event, handle 102 will rotate relative to spring washer 80c and no rotation will be imparted to handle nut 106. This is because the inner peripheral edge portions of spring washer 80c engage handle 102 while outer peripheral edge 82 engages handle nut 106. Due to the difference in the radius for the inner peripheral edge portions of spring washer 80c as compared to the radius of outer peripheral edge 82, less torque is required to cause rotation of handle 102 relative to the spring washer than to cause rotation of handle nut 106 or of spring washer 80c relative to the nut. It will be recognized that all of spring washers 80a,80b and 80c are identical in construction.

The arrangement described for spring washers 80a,80b and gland 70 provides a controlled slippage means for providing relative slippage between various components without having any direct rotational sliding movement relative to an end face of the packing. The controlled slippage means includes the outer support ring 52, gland 70, and cooperating spring washers 80a,80b. In addition, these two spring washers provide the axial force applying means in cooperation with packing nut 90. Although the preferred embodiment has been shown and described with reference to two spring washers, it should be appreciated that any number of such spring washers disposed in a stacked parallel and/or series relationship could be employed to accommodate various conditions or circumstances. Such modifications do not, however, in any way depart from the overall intent or scope of the present invention.

In the preferred form, all of the metal parts are of suitable stainless steel. Packing 54 comprises a wire reinforced Grafoil, while support rings 50,52 are constructed of Vespel which is fifteen percent (15%) graphite filled. However, it will be recognized that many of the features of the present invention may be used with packings and support rings or other materials and that some or all of the metal parts may be replaced with appropriate different metals or plastic materials. Such modifications and/or substitutions may be desirable to accommodate different valve applications.

The invention has been described with reference to a preferred embodiment. Obviously, alterations and modifications will occur to others upon reading and understanding this specification. It is my intention to include all such alterations and modifications insofar as they come within the scope of the appended claims or the equivalents thereof.

Having thus described the invention, it is now claimed:

1. A packing arrangement for a valve stem comprising:

a valve body having a valve stem passage therein rotatably receiving a valve stem;

a packing of carbonaceous material reinforced by knitted wire received in said passage around said stem;

packing support rings of high temperature resistant plastic material positioned at opposite axial ends of said packing and having chevron surfaces engaging said packing;

force applying means for axially compressing said packing between said support rings and expanding same radially into sealing engagement with said stem and passage; and, at least one said support ring located at the end of said packing adjacent said force applying means having gripping means thereon for gripping said packing and preventing sliding rotation thereof relative to said packing.

2. The packing arrangement as defined in claim 1 wherein said gripping means comprises generally radial notches in said chevron surface of said one support ring.

3. The packing arrangement as defined in claim 1 including a gland interposed between said one support ring and said force applying means.

4. The packing arrangement as defined in claim 3 wherein said force applying means includes a nut threaded on said stem and at least one spring washer interposed between said nut and gland and having an outer periphery engaging said gland.

5. The packing arrangement as defined in claim 3 wherein said force applying means includes a nut threaded on said stem and a pair of reversely positioned spring washers interposed between said nut and said gland, and cooperating means between said stem and said spring washers for preventing relative rotation between said stem and said spring washers.

6. In an arrangement for preventing sliding rotation directly against one end of a packing surrounding a valve stem in a stem passage of a valve body: a packing support ring engaging said one end of said packing; a gland engaging said support ring; a pair of reversely positioned spring washers, the outer periphery of one said washer engaging said gland and the outer periphery of the other of said washers engaging a nut threaded on said stem; and, said stem and said spring washers having cooperating means for preventing relative rotation between said stem and said washers.

7. The arrangement as defined in claim 6 wherein said cooperating means for preventing relative rotation between said stem and washers comprises opposed flats on said stem and opposed flats on a central hole in said washers through which said stem is received.

8. The arrangement as defined in claim 7 wherein said spring washers are generally frusto-conical and include an outer circular peripheral edge and an inner peripheral edge portion lying on the periphery of a circle, and said opposed flats on said washers being spaced axially further from said outer peripheral edge than the axial spacing of said inner peripheral edge portion from said outer peripheral edge.

9. A packing support ring having opposite surfaces, one of said surfaces being substantially flat and the other of said surfaces being generally chevron shaped, and said chevron shaped surface including gripping means for gripping a packing to prevent sliding rotation between the packing and ring.

10. The ring as defined in claim 9 wherein said gripping means comprises a plurality of circumferentially-spaced generally radially extending notches.

11. The ring as defined in claim 10 wherein said notches are generally V-shaped.

12. The ring as defined in claim 9 wherein said ring is of high temperature resistant polyimide plastic material with carbon filler.

13. A generally frusto-conical spring washer having a circular outer peripheral edge and a central hole therethrough defining an inner peripheral edge, said inner peripheral edge including opposed generally straight inner peripheral edge portions defining a first spring portion spring rate and opposite generally arcuate other inner peripheral edge portions defining a second spring portion spring rate, and said straight inner peripheral edge portions being axially spaced farther from said outer peripheral edge than the axial spacing between said other inner peripheral edge portions and said outer peripheral edge said other inner peripheral edge portions being curved and lie on the periphery of a circle and said straight inner peripheral edge portions being spaced-apart a distance substantially less than the spacing between said opposite other inner peripheral edge portions whereby upon compressive deflection, said spring washer exerts a variable spring rate upon deformation of said straight inner peripheral edge portions and said other arcuate inner peripheral edge portions.

14. A valve body having a stem passage defined by a side wall rotatably receiving a valve stem; an inwardly extending flange in said passage; an outwardly extending shoulder on said valve stem for cooperation with said flange to prevent outward displacement of said valve stem from said passage; and, a thrust washer interposed between said flange and shoulder substantially filling the radial space between said stem and the side wall of said passage, said thrust washer having one end surface in facing relation to said flange, an other end surface in opposed spaced relation to said one end surface and an outer peripheral surface with a chamfer extending between said one end surface and said outer peripheral surface, and said thrust washer further having a coating of low friction material on the surfaces thereof and at least one of said one and other end surfaces including lubricant housing means.

15. The valve body as defined in claim 14 wherein said chamfer extends over substantially less than one-half the radial width of said thrust washer.

16. The valve body as defined in claim 14 wherein said lubricant housing means comprises notches.

17. A packing arrangement for a valve stem comprising:

a valve body having a stem passage rotatably receiving a valve stem;

packing means surrounding said stem within said passage for sealing said passage against leakage of fluid therethrough;

force applying means cooperating with said stem for axially compressing said packing and expanding said packing radially into sealing engagement with said passage and stem;

said stem being rotatable relative to said packing for moving a valve between open and closed positions and said force applying means being rotatable with said stem; and, controlled slippage means interposed between said force applying means and said packing for providing rotation of said force applying means relative to said packing without sliding rotation of any part directly against said packing, said controlled slippage means including a packing support ring engaging said packing and having gripping means thereon for preventing relative sliding rotation between said packing and support ring, and a gland interposed between said force applying means and said support ring wherein said gland is rotatable with said stem and force applying means relative to said support ring.

18. A packing arrangement for a valve stem comprising:
a valve body having a stem passage rotatably receiving a valve stem;
packing means surrounding said stem within said passage for sealing said passage against leakage of fluid therethrough;
force applying means including a nut received on said stem and a pair of spring washers interposed between said nut and a controlled slippage means for axially compressing and radially expanding said packing into sealing engagement with said passage and stem, said spring washers having central holes therethrough receiving said stem with said holes and stem being cooperatively shaped for preventing relative rotation therebetween;
said stem being rotatable relative to said packing for moving a valve between open and closed positions and said force applying means being rotatable with said stem; and,
said controlled slippage means interposed between said force applying means and said packing for providing rotation of said force applying means relative to said packing without sliding rotation of any part directly against said packing.

19. A packing arrangement for a valve stem comprising:
a valve body having a stem passage rotatably receiving a valve stem;
packing means surrounding said stem within said passage for sealing said passage against leakage of fluid therethrough;
force applying means cooperating with said stem for axially compressing said packing and expanding said packing radially into sealing engagement with said passage and stem;
said stem being rotatable relative to said packing for moving a valve between open and closed positions and said force applying means being rotatable with said stem; and,
controlled slippage means interposed between said force applying means and said packing for providing rotation of said force applying means relative to said packing without sliding rotation of any part directly against said packing, said controlled slippage means including a packing support ring having a chevron surface engaging said packing for radially expanding same and said chevron surface having notches therein gripping said packing for preventing relative sliding rotation between said packing and said support ring.

20. A packing arrangement for a valve stem comprising:
a valve body having a stem passage rotatably receiving a valve stem;
packing means comprised of a flexible carboneaceous material surrounding said stem within said passage for sealing said passage against leakage of fluid therethrough;
force applying means cooperating with said stem for axially compressing said packing and expanding said packing radially into sealing engagement with said passage and stem;
support rings disposed against opposed axial ends of said packing, said support rings being comprised of polyimide plastic material and having chevron surfaces engaging said packing for expanding same radially, the one of said support rings located at the end of said packing adjacent said force applying means having notches in the chevron surface thereof engaging said packing;
said stem being rotatable relative to said packing for moving a valve between open and closed positions and said force applying means being rotatable with said stem; and,
controlled slippage means including one of said support rings interposed between said force applying means and said packing for providing rotation of said force applying means relative to said packing without sliding rotation of any part directly against said packing.

21. The packing arrangement as defined in claim 17 wherein said force applying means includes a nut threaded on said stem and at least one spring washer interposed between said nut and gland.

22. The packing arrangement as defined in claim 21 wherein said spring washer has its outer periphery engaging said gland.

23. The packing arrangement as defined in claim 21 wherein said spring washer has a central hole therethrough receiving said stem, said hole and stem being cooperatively shaped for preventing relative rotation between said stem and spring washer.

24. The packing arrangement as defined in claim 21 including a pair of reversely positioned spring washers interposed between said nut and gland.

25. The packing arrangement as defined in claim 24 wherein said spring washers are positioned with the outer periphery of one engaging said gland and with the outer periphery of the other engaging said nut.

26. The packing arrangement as defined in claim 25 including cooperating means between said stem and spring washers for preventing relative rotation between said stem and spring washers.

27. The packing arrangement as defined in claim 18 wherein said spring washers are reversely positioned with the outer periphery of one engaging said nut and with the outer periphery of the other engaging part of said controlled slippage means.

28. The packing arrangement as defined in claim 20 wherein said notches are generally V-shaped.

* * * * *